United States Patent Office 3,288,891
Patented Nov. 29, 1966

3,288,891
PROCESS FOR PREPARING DIALKYL CARBALKOXYALKENYL AND CARBAROXYALKENYL PHOSPHATE ESTERS
Edward U. Elam, Kingsport, Tenn., assignor to Eastman Kodak Company, Rochester, N.Y., a corporation of New Jersey
No Drawing. Filed Oct. 29, 1963, Ser. No. 319,647
11 Claims. (Cl. 260—971)

The invention relates to the preparation of organic phosphorous compounds of the general formula

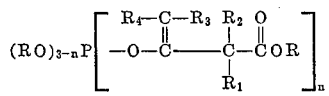

in which R is an organic radical derived from an organic phosphite and represents an alkyl group of from 1 to 8 carbon atoms, straight or branch-chained such as methyl, ethyl, hexyl and octyl, or R represents a benzene radical such as phenyl and substituted phenyl such as chlorophenyl; each pair of the groups $R_1$, $R_2$ and $R_3$, $R_4$ represents the same or different alkyl groups of from 1 to 8 carbon atoms or each pair represents an alkylene group —$(CH_2)_4$— or —$(CH_2)_5$— which together with the carbon atom to which it is attached forms a saturated carbocyclic ring of from 5 to 6 carbon atoms. Thus each of the four alkyl groups can be methyl or ethyl, or $R_1$ and $R_2$ can be ethyl and butyl, respectively, when $R_3$ and $R_4$ are ethyl and butyl, respectively, or when taken together can form a five-membered ring or a six-membered ring. $n$ is a positive integer of from 1 to 3.

The organic phosphorous compounds are prepared by reaction of organic phosphites with cyclobutanediones in the presence of alkali according to the following general equation

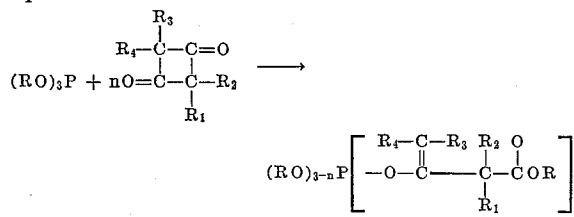

Accordingly, when $n=1$, 2 or 3 the compounds have the respective formulas

I 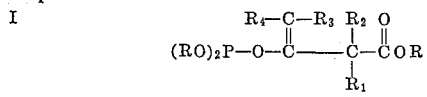

II 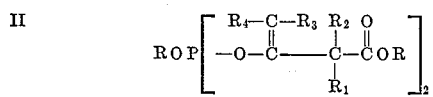

III 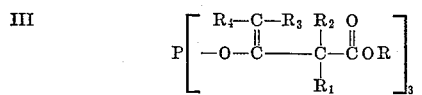

in which the R groups have the meaning given above.

The process is not to be confused with the reaction of the above cyclobutanediones with the phosphites in absence of alkali which produces isomeric compounds such as

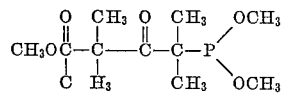

The phosphites above of formula $(RO)_3P$ useful in preparing the phosphorous compounds of the invention are, for example, aliphatic phosphites such as trimethyl-, triethyl-, tripropyl-, tributyl-, tri-isobutyl-, trihexyl-, triheptyl-, and trioctyl phosphites, and aromatic phosphites such as triphenyl phosphite and trichlorophenyl phosphite.

The reactions of the cyclobutanediones with the phosphites and alkali according to the above general equation can be carried out by heating these reactants, preferably in an inert atmosphere such as nitrogen, and recovering the product by the usual distillation methods. The conditions under which this reaction is run are not critical. In general, temperatures from 25° C. to 250° C., and preferably from 150° C. to 225° C. may be used. The exact temperatures will depend upon the nature, and particularly on the molecular weight, of the reactants, lower molecular weight compounds generally reacting at lower temperature than high molecular weight ones. The molar proportions of reactants used are not critical. In general, compounds of Formula I above are obtainable by using an excess of the phosphite. More compounds of Formulas II and III are obtainable by use of an excess of the cyclobutanedione.

The alkali used in the reaction described above includes organic alkali especially tertiary amines, for example, pyridine, tributylamine, triethylenediamine, quinoline, piperazine, and the like. More strongly basic materials such as alkali metal alkoxides, particularly sodium, potassium, or lithium ethoxide or methoxides are also effective.

The organic phosphorous compounds of the invention are especially useful as chemical intermediates, e.g., they undergo hydrolysis to yield the corresponding phosphites and esters. Hydroxyketones are obtained by reduction of the compounds. They can be used in the preparation of useful insecticides, plasticizers for synthetic polymers and lubricants.

The following examples are illustrative of the processes and products of our invention.

*Example I*

A mixture of 140 g. (1 mole) of tetramethyl-1,3-cyclobutanedione, 166 g. (1 mole) of triethyl phosphite, and 5 g. of triethylenediamine was heated overnight. At first, the mixture refluxed at about 160° C., but the temperature gradually rose to 190° C. The mixture was dark, and some tarry material had formed. The product was distilled to give 113 g. of ethyl 3-(diethoxy-phosphinooxy)-2,2,4-trimethyl-3-pentenoate, B.P. 104–105° C. (0.6 mm.), $n_D^{20}$ 1.4541–1.4552, having the formula below and some higher boiling material.

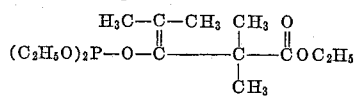

Redistillation of the combined high boilers from several experiments gave a fraction, B.P. 125° C. (1.3 mm.), $n_D^{20}$ 1.4520, which was

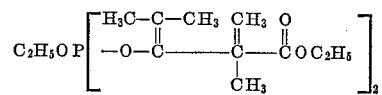

*Example II*

A mixture of 250 g. (1 mole) of tributyl phosphite, 140 g. (1 mole) of tetramethyl-1,3-cyclobutanedione, and 10 g. of triethylenediamine was heated overnight to 210° C. in a nitrogen atmosphere. Distillation of the product gave butyl 3-(dibutoxyphosphinooxy)-2,2,4-trimethyl-3-pentenoate, B.P. 165–71° C. (1.8 mm.), $n_D^{20}$ 1.4575.

*Example III*

The procedure of Example I was repeated with trimethyl phosphite and 2,4-dibutyl-2,4-diethyl-1,3-cyclobutanedione. Methyl 3-(dimethoxyphosphinooxy)-2-butyl-2,4-diethyl-3-octenoate, B.P. 165–75° C. (1.8 mm.) was obtained.

Example IV

Triphenyl phosphite (62 g.) tetramethyl-1,3-cyclobutanedione (28 g.) and triethylenediamine (5 g.) were heated to 210° C. for three days. After removal of unconverted starting material by distillation, phenyl 3-(diphenoxyphosphinooxy)-2,2,4-trimethyl-3-pentenoate remained as a viscous oil.

Example V

The process of Example I was carried out using trimethyl phosphite in place of triethyl phosphite to obtain methyl 3 - (dimethoxyphophinooxy)-2,2,4-trimethyl-3-pentenoate.

Example VI

The process of Example I was carried out using trioctyl phosphite in place of triethyl phosphite to obtain octyl 3-(dioctoxyphosphinooxy)-2,2,4-trimethyl-3-pentenoate.

In the manner of the above examples other compounds having Formulas I, II or III above can be obtained by reacting the phosphites of formula $(RO)_3P$, e.g., dimethyl- and diethyl phosphites, with other cyclobutanediones such as tetraoctyl-1,3-cyclobutanedione; 2,4-dihexyl-2,4-diethyl-1,3-cyclobutanedione and 2-cyclohexyl-4-cyclohexyl-1,3-cyclobutanedione.

The invention has been described in considerable detail with particular reference to certain preferred embodiments thereof, but it will be understood that variations and modifications can be effected within the spirit and scope of the invention as described hereinabove, and as defined in the appended claims.

What I claim is:

1. A process for preparing esters of phosphorous acid having the formula

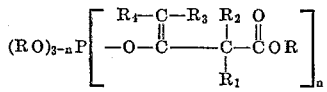

which comprises heating in the presence of alkali and a phosphite having the formula $(RO)_3P$, a cyclobutanedione having the formula

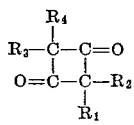

wherein R represents a member of the class consisting of alkyl of from 1 to 8 carbon atoms and a benzene radical, each pair of groups $R_1$, $R_2$ and $R_3$, $R_4$ represents a member of the class consisting of alkyl groups of from 1 to 8 carbon atoms and alkylene groups which together with the carbon atom to which they are attached form a saturated carbocyclic ring of 5 to 6 carbon atoms, and $n$ represents a positive integer of from 1 to 3.

2. The process of claim 1 wherein an excess of the phosphite is used.

3. The process of claim 1 wherein an excess of the cyclobutanedione is used.

4. A process for preparing esters of phosphorous acid having the formula

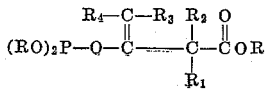

which comprises heating in the presence of alkali and a phosphite having the formula $(RO)_3P$, a compound having the formula

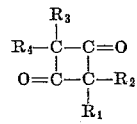

wherein R represents a member of the class consisting of alkyl of from 1 to 8 carbon atoms and a benzene radical, each pair of groups $R_1$, $R_2$ and $R_3$, $R_4$ represents a member of the class consisting of alkyl groups of from 1 to 8 carbon atoms and alkylene groups which together with the carbon atom to which they are attached form a saturated carbocyclic ring of 5 to 6 carbon atoms.

5. A process of preparing esters of phosphorous acid having the formula

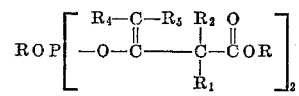

which comprises heating in the presence of alkali and a phosphite having the formula $(RO)_3P$, a compound having the formula

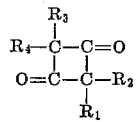

wherein R represents a member of the class consisting of alkyl of from 1 to 8 carbon atoms and a benzene radical, each pair of groups $R_1$, $R_2$ and $R_3$, $R_4$ represents a member of the class consisting of alkyl groups of from 1 to 8 carbon atoms and alkylene groups which together with the carbon atom to which they are attached form a saturated carbocyclic ring of 5 to 6 carbon atoms.

6. A process for preparing ethyl 3-(diethoxyphosphinooxy)-2,2,4-trimethyl-3-pentenoate which comprises heating tetramethyl-1,3-cyclobutanedione in the presence of alkali and triethyl phosphite.

7. A process for preparing butyl 3-(dibutoxyphosphinooxy)-2,2,4-trimethyl-3-pentenoate which comprises heating tetramethyl-1,3,-cyclobutanedione in the presence of alkali and tributyl phosphite.

8. A process for preparing methyl 3-(dimethoxyphosphinooxy)-2-butyl-2,4-diethyl - 3 - octenoate which comprises heating 2,4-dibutyl-2,4-diethyl-1,3-cyclobutanedione in the presence of alkali and trimethyl phosphite.

9. A process for preparing phenyl 3-(diphenoxyphosphinooxy) -2,2,4-trimethyl-3-pentenoate which comprises heating tetramethyl-1,3-cyclobutanedione in the presence of alkali and triphenyl phosphite.

10. A process for preparing methyl 3-(dimethoxyphosphinooxy)-2,2,4-dimethyl-3-pentenoate which comprises heating tetramethyl-1,3-cyclobutanedione in the presence of alkali and trimethyl phosphite.

11. The process of claim 1 wherein the alkali is a tertiary amine.

No references cited.

CHARLES B. PARKER, *Primary Examiner.*

FRANK M. SIKORA, *Assistant Examiner.*